United States Patent [19]
Hornstein

[11] 3,934,375
[45] Jan. 27, 1976

[54] ARRANGEMENT FOR AUTOMATICALLY LOADING AND UNLOADING A MACHINING APPARATUS

[75] Inventor: Maurice Hornstein, St. Cloud, France

[73] Assignee: Intercontinental Trading Company, Puteaux, France

[22] Filed: Dec. 24, 1974

[21] Appl. No.: 536,193

[30] Foreign Application Priority Data
Oct. 11, 1974 France................................ 74.34259

[52] U.S. Cl................. 51/101 R; 51/215 E; 198/19; 198/20
[51] Int. Cl.²........................................ B24B 17/02
[58] Field of Search..... 51/33 W, 47, 50 PC, 101 R, 51/215 E, 215 UE; 198/19, 20 R, 203, 89; 90/21 A

[56] References Cited
UNITED STATES PATENTS

| | | | |
|---|---|---|---|
| 2,883,800 | 4/1959 | Reaser | 51/101 R |
| 2,966,010 | 12/1960 | Guignard | 51/33 W |
| 3,434,584 | 3/1969 | Winkler | 198/89 |
| 3,464,537 | 9/1969 | Thull | 198/89 |
| 3,678,628 | 7/1972 | McMaster | 51/101 R |
| 3,878,650 | 4/1975 | Klotzbach | 51/101 R |

FOREIGN PATENTS OR APPLICATIONS

| | | | |
|---|---|---|---|
| 849,638 | 9/1960 | United Kingdom | 51/47 |

Primary Examiner—Al Lawrence Smith
Assistant Examiner—Nicholas P. Godici
Attorney, Agent, or Firm—Norman Lettvin; Gerald S. Geren

[57] ABSTRACT

The invention provides an arrangement for delivering to a work table a workpiece to be machined on that table and for removing the workpiece after it has been machined. The arrangement includes three endless convyeors in a line, of which a central, non-driving conveyor is fixedly mounted on the table between an upstream conveyor and a downstream conveyor. The upstream conveyor and the downstream conveyor are mounted on frames separate from the table and are designed for displacement between a position in which they are both remote from the central conveyor and a position in which they are both adjacent the central conveyor. The upstream and downstream conveyors rotate the central conveyor when in their adjacent position. Retractable retaining means position the workpiece received on the central conveyor and hold it on the work table throughout the entire machining operation. Means are provided for lowering the central conveyor from the workpiece during the machining operation. The arrangement according to the invention is particularly intended to be used for loading and unloading an installation for machining the edges of a flat object.

12 Claims, 4 Drawing Figures

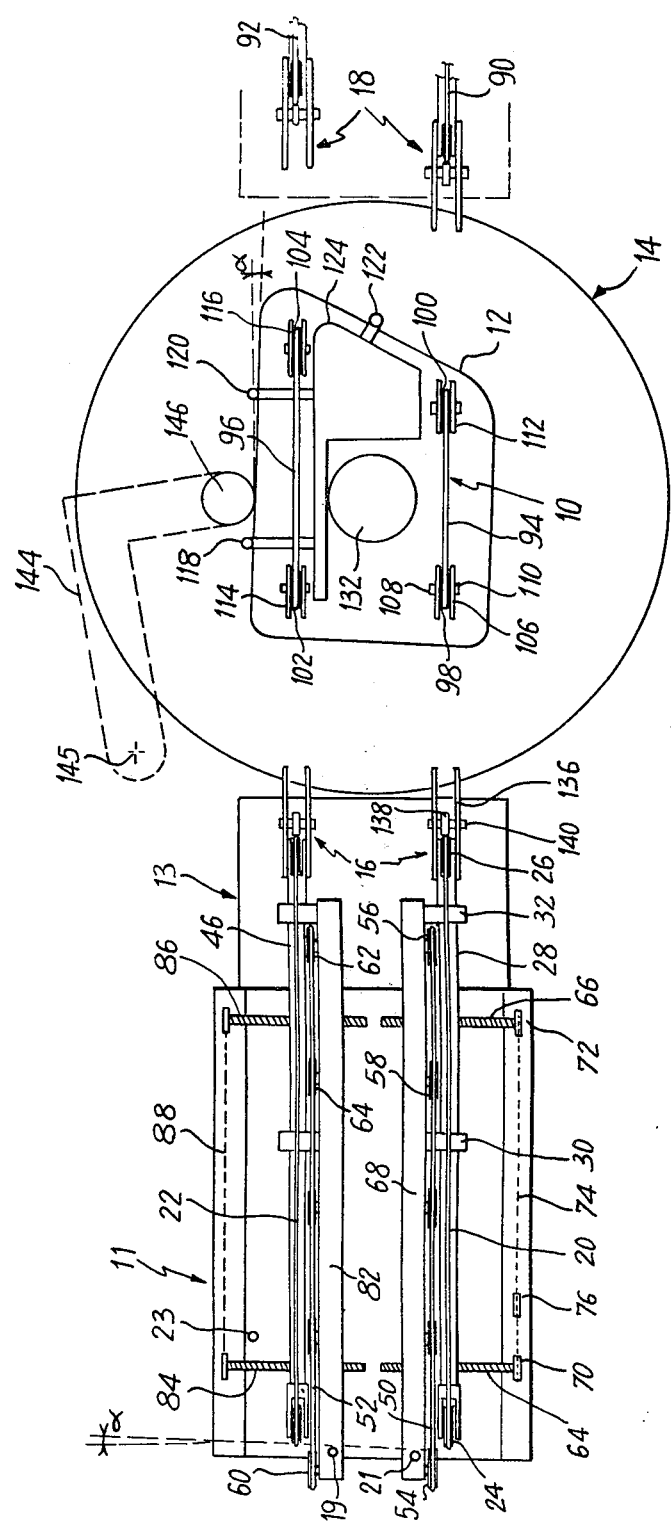

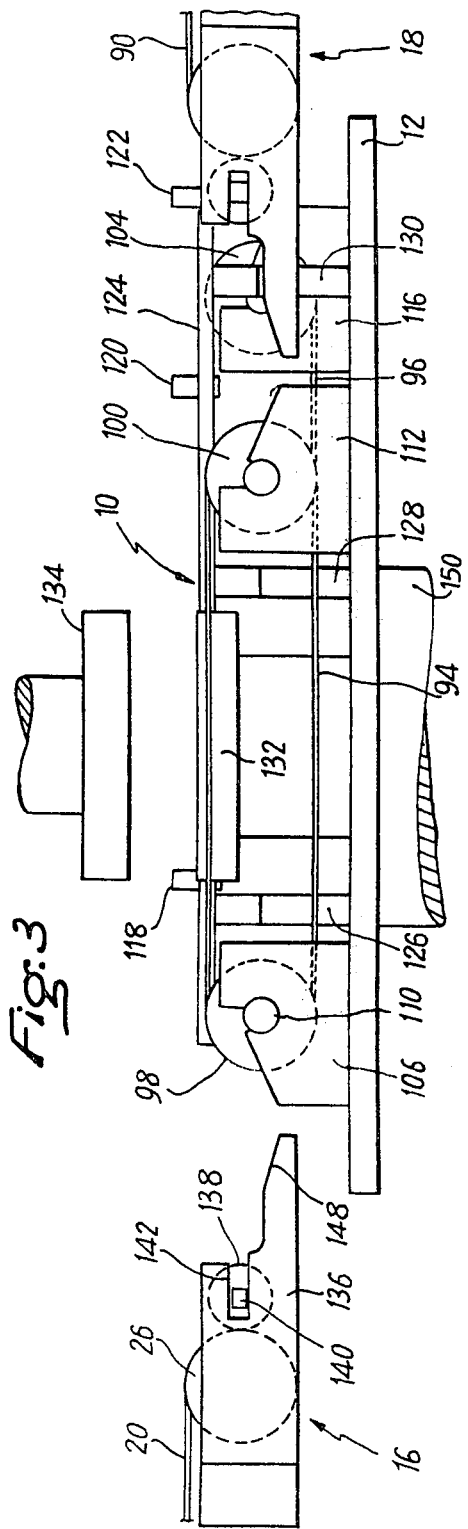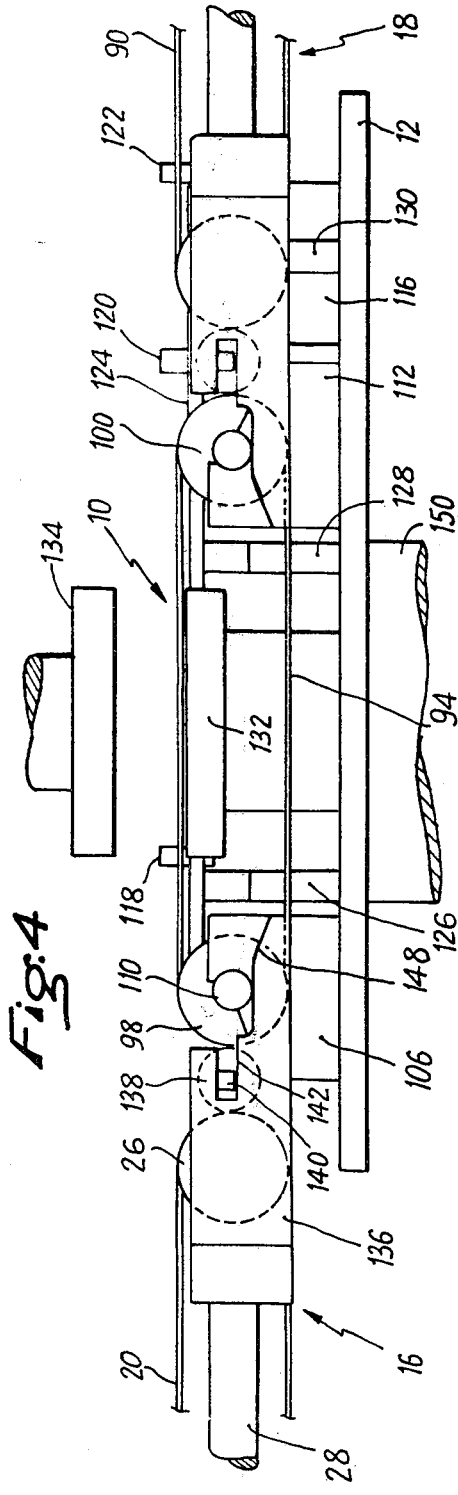

ARRANGEMENT FOR AUTOMATICALLY LOADING AND UNLOADING A MACHINING APPARATUS

FIELD OF THE INVENTION

This invention relates to a combination including an arrangement for delivering to a work table a workpiece to be machined on that table, and for removing the workpiece after it has been machined.

The invention also relates to the use of this arrangement for the automatic loading and unloading of an installation for machining the edges of a flat object, more especially the edges of plate glass.

SUMMARY OF THE INVENTION

According to the invention there is provided the combination comprising a machining table provided with means for machining a workpiece thereon, and an arrangement for delivering the workpiece to the table and for removing the machined workpiece therefrom, the combination comprising a central, non-driven conveyor fixedly mounted on the table; a first frame separate from the table and situated upstream thereof and in line with the central conveyor; an upstream conveyor mounted on the first frame, a second frame separate from the table and situated downstream thereof and in line with the central conveyor; a downstream conveyor mounted on the second frame; means for horizontally displacing the upstream and downstream conveyors between a first position where they are both remote from the central conveyor and a second position where they are both adjacent the central conveyor; drive connection means for enabling the upstream and downstream conveyors to drive the central conveyor when in the said second position; retractable retaining means for positioning the workpiece received on the central conveyor and for holding it on the work table throughout the entire machining operation; and means for lowering the central conveyor from the workpiece during the machining operation; whereby the central conveyor receives and retains a workpiece from the upstream conveyor when the upstream and downstream conveyors are in their said second positions, machine the workpiece while the upstream and downstream conveyors are in their first positions and then delivers the workpiece to the downstream conveyor when the upstream and downstream conveyors are back in their said second positions.

BRIEF DESCRIPTION OF THE DRAWINGS

FIG. 2 is a view from above of the arrangement and installation illustrated in FIG. 1.

FIG. 3 is a partial view of the three conveyors in an intermediate position where the upstream conveyor and the downstream conveyor are moving towards the central conveyor.

FIG. 4 shows the conveyors illustrated in FIG. 3 in their so-called adjacent positions, the central conveyor being driven both by the upstream conveyor and by the downstream conveyor.

DETAILED DESCRIPTION OF PREFERRED EMBODIMENT

Figure 1:
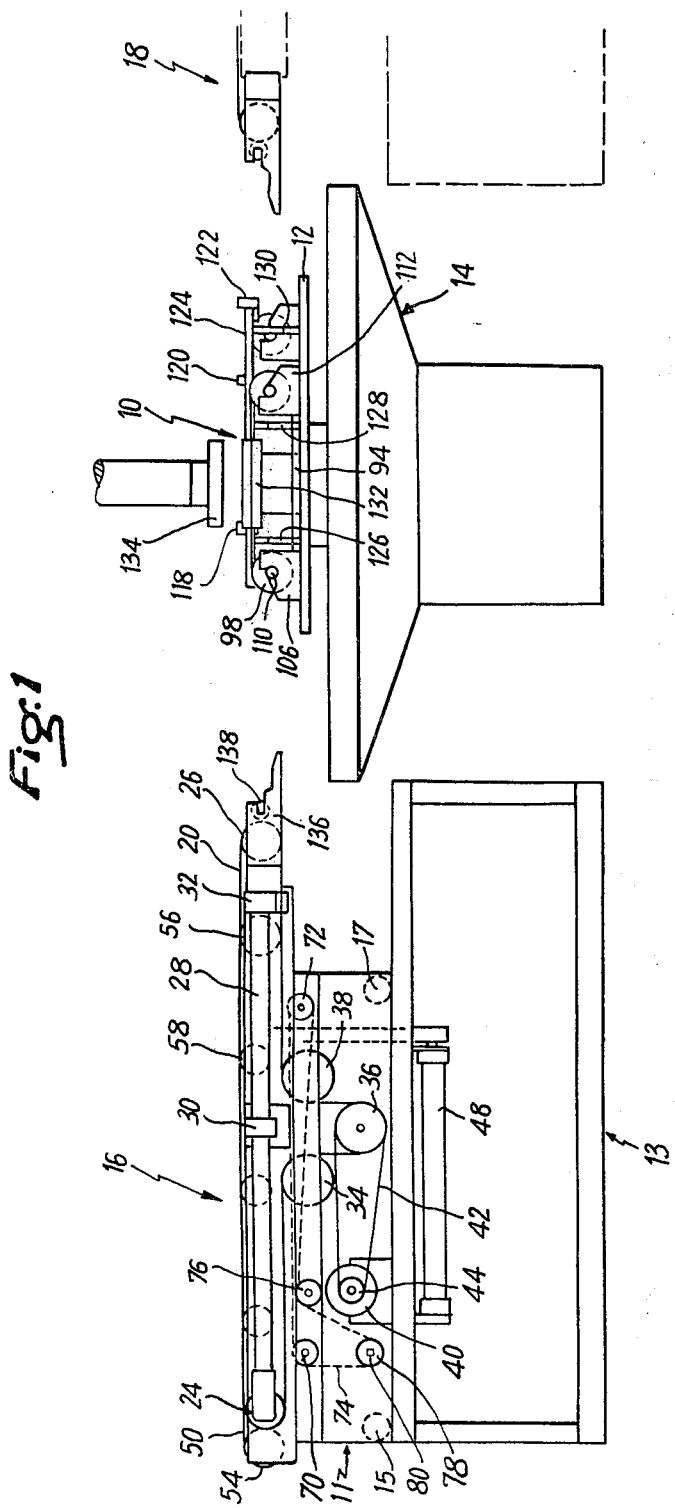
FIG. 1 is a partial fron view of an arrangement according to the invention associated with an installation for machining the edges of a flat object.

The arrangement illustrated in FIGS. 1 and 2 comprises three conveyors arranged in a line, namely a central freely circulating conveyor 10 fixedly mounted on a rotary template 12 of an installation 14 for machining the edge of a flat object, a conveyor 16 upstream of the conveyor 10 and a conveyor 18 downstream of the conveyor 10. The terms "upstream" and "downstream" refer to the direction of conveying of the flat object. The downstream conveyor 18 is only partly shown in FIGS. 1 and 2 in view of the fact that it is an exact mirror image of the upstream conveyor 16.

The upstream conveyor 16 comprises a chassis 11 mounted on rollers, such as 15 and 17, for horizontal displacement relative to a frame 13 under the action of a jack 48. The chassis 11 comprises two parallel, independent supports 68 and 82 which are displaceable laterally and independently relative to the chassis 11 to enable the distance between them to be adjusted in dependence upon the width of the workpiece to be machined. The support 68 is laterally adjustable by means of two screw-threaded rods 64 and 66 with the same pitch which cooperate with it and which are provided at their ends with identical sprocket wheels 70 and 72. A chain 74 circulates around the sprocket wheels 70 and 72, a sprocket wheel 76 and a sprocket wheel 78 whose spindle 80 terminates in a square form to enable a lever to be fitted to it. The support 82 is laterally displaceable relative to the chassis 11 by means of two screw-threaded rods 84 and 86 which may be driven by a chain 88, as in the case of the support 68.

The upstream conveyor also comprises two endless, parallel adjustable belts 20 and 22. The belt 20 circulates around two pulleys 24 and 26 mounted at the ends of an arm 28 which is slidable relative to the support 68 in two sleeves 30 and 32 and which may be locked to the support 68 in any required position, depending upon the length of the central conveyor. The arm 28 may be locked to the support 68 by any suitable locking mechanism provided in one or both of the two sleeves 30 and 32. The belt 20 also travels around three winding pulleys 34, 36 and 38. The pulley 36 is driven by a motor 40 fixed to the chassis 11 by way of a chain 42 driven by a sprocket wheel 44 fixed to the shaft of the motor. The belt 20 may thus be driven by the motor 40, irrespective of the position of the arm 28 relative to the support 68. The belt 22 similarly circulates around two pulleys mounted at each of the ends of a sliding arm 46 which may be locked relative to the support 82 in the same way as the arm 28 can be locked relative to the support 68. The belt 22 is driven synchronously with the belt 20 by an assembly of three winding pulleys (not shown in the drawings) similar to the pulleys 34, 36 and 38.

The upstream conveyor further comprises two non-adjustable endless belts 50 and 52 parallel to one another and to the belts 20 and 22 and arranged between the belts 20 and 22. The belt 50 travels around two end pulleys 54 and 56 mounted on the support 68, around supporting pulleys such as 58 and around three winding pulleys which correspond to the pulleys 34, 36 and 38. The belt 52 travels around end pulleys 60 and 62 mounted on the support 82, over supporting pulleys such as 64 and around three drive pulleys (not shown).

In order to enable the endless belts 20, 22, 50 and 52 to be synchronously driven, irrespective both of the lateral adjustment of the supports 68 and 82 relative to the chassis 11 and of the adjustment of the arms 28 and 46 relative to the respective supports 68 and 82, the four sets of three winding pulleys may be displaced along axes corresponding to the pulleys 34, 36, and 38, the four pulleys on a given shaft being synchronously rotated, for example by splines on that shaft.

The downstream conveyor 18 is a mirror image of the upstream conveyor 16 and comprises two adjustable endless belts 90 and 92 and two fixed endless belts (not shown). It can be seen from FIG. 2 that the adjustment of the two belts 90 and 92 is not in this instance the same, whereas the adjustment of the belts 20 and 22 is the same.

The central conveyor 10 comprises two parallel endless belts 94 and 96 whose length and spacing correspond to the shape and size of the workpiece to be machined. The interval between the belts 94 and 96 determines the distance between the belts of the upstream and downstream conveyors. The belts 20 and 90 are colinear with the belt 94, and the belts 22 and 92 are colinear with the belt 96. The belt 94 travels around two pulleys 98 and 100, whilst the belt 96 travels around two pulleys 102 and 104. The pulley 98 is mounted for free rotation about a spindle designed for free, vertical displacement in a stirrup 106, this spindle carrying rollers 108 and 110 at its ends. The pulleys 100, 102, 104 are similarly mounted in stirrups 112, 114 and 116. The stirrups 106, 112, 114 and 116 are fixed to the template 12.

The arrangement comprises a rectractable retaining means which includes positioning means in the form of three stops 118, 120 and 122 mounted on a plate 124 designed for vertical displacement under the action of three jacks 126, 128 and 130 fixed to the template 12. The retaining means also includes holding means in the form of a lower presser 132 which is fixed relative to the table of the machine, i.e. relative to the template 12, and an upper presser 134 which is vertically displaceable. The presser 134 is in the form of a slide moved by a jack which may be rotated simultaneously with the template 12 so as to enable a workpiece to be machined to be held in a fixed position relative to the template throughout the entire rotation of the template.

At its end nearest the central conveyor, each of the sliding arms of the upstream conveyor and of the downstream conveyor comprises a fork in which one of the end pulleys of the corresponding belt is able to rotate freely, and an intermediate roller designed to drive by friction an end pulley of a belt of the central conveyor when the conveyors are in the so-called adjacent position. The arm 28 of the upstream conveyor is extended by a fork 136 in which is mounted the pulley 26 and an intermediate roller 138 mounted for free rotation about a spindle 140 whose ends slide in a slot 142 (FIGS. 3 and 4). Each fork has two vertical surfaces each terminating in the form of a cam which cooperates with one of the rollers mounted on the spindle of a pulley of the central conveyor.

The machine 14 comprises a mobile machining block carried by a structure 144 which oscillates about a shaft 145 and which has a guide roller 146 designed to follow the contour of the template 12, and a grinding wheel designed to machine the edge of the workpiece during rotation of the template. The structure 144 is subjected to the action of a jack which establishes contact, between the guide roller and the template and between the grinding wheel and the edge of the workpiece.

The arrangement operates as follows:

At the beginning of a work cycle, a workpiece to be machined is placed on the non-adjustable belts of the upstream conveyor. To this end, this upstream end comprises adjustable stops 19, 21 and 23 (FIG. 2) which enable the workpiece to be machined to be positioned in such a way that it subsequently arrives on the central conveyor in a closely predetermined position. For example, if the workpiece to be machined is a sheet of window glass for the door of a motor vehicle, the sheet being substantially in the form of a rectangular trapezium corresponding to the outline of the template 12 in FIG. 2, the arrangement is such that the parallel sides of the plate of glass are offset by an angle $\alpha$ of a few degrees relative to the direction in which the three conveyors are aligned. The rear stops 21 and 23 thus defined a line offset by an angle $\alpha$ relative to the normal to the direction in which the three conveyors are aligned.

A programmer which determines the work cycle of the machining installation in known manner then switches on the motor 40 and actuates the jack 48 of the upstream conveyor, and similarly switches on the motor and actuates the jack of the downstream conveyor. The forks of the upstream conveyor and of the downstream conveyor then move towards the stirrups of the central conveyor fixed to the template of the machine. Before reaching the so-called adjacent position, the forks are in an intermediate position shown in FIG. 3, the pulleys 98 and 100 being in their lower position under the effect of their own weight, and the template 12 being locked in a position such that the central conveyor is in line with the upstream and downstream conveyors. When the forks approach the central conveyor, the cam 148 of the fork 136 cooperates with the roller 110 of the pulley 98 to move it into its upper position (FIG. 4). The pulley 26 then drives the pulley 98 through the roller 138. The same obviously applies to all the pulleys of the central conveyor. In the position shown in FIG. 4, the upstream and downstream conveyors, which are synchronously driven, drive the belts of the central conveyor by friction, thus forming a continuous conveyor.

The workpiece to be machined, which had been placed on the upstream conveyor, then arrives on the central conveyor and is held by the stops 118, 120 and 122. It can be seen from FIG. 2 that the two parallel sides of the template are offset by the same angle $\alpha$ relative to the direction in which the three conveyors are aligned to enable the workpiece to be precisely positioned against the stops 118, 120 and 122. The front side of the workpiece coming from the upstream conveyor comes into contact with the stop 122, whilst one of the parallel sides of the workpiece comes into contact with stop 120 and then with the stop 118 under the effect of the entraining forces generated by the central conveyor. The upstream and downstream conveyors then move away from the central conveyor, as a result of which the pulleys of the central conveyor are lowered. The workpiece then rests on the lower presser 132. Under the effect of a jack, the presser 134 is lowered towards the presser 132 so that the workpiece is held between these two pressers whilst, at the same time, being kept strictly vertically in line with the template. Once the workpiece has been locked in position in line with the template, the plate 124 retracts under the action of the jacks 126, 128 and 130 supporting it. The template then makes a revolution about its shaft 150, the upper presser 134 rotating synchronously with the shaft 150.

During one complete revolution of the template, the roller 146 follows the contour of the template, whilst the grinding wheel of the machining block remains in contact with the edge of the workpiece. After one complete revolution of the template, the central conveyor is back in the position which it occupied at the beginning of the cycle. The upstream and downstream conveyors then move back towards the central conveyor in order to rotate it and to release the workpiece after the upper presser 134 has been raised. Once the machined workpiece has arrived on the downstream conveyor, the plate 124 moves back into position to stop another workpiece coming from the upstream conveyor.

The various working phases of the arrangement according to the invention can be initiated by the controlling programmer of the machining installation without any need for significant modifications to be made to that programmer.

The arrangement according to the invention is particularly, though not exclusively intended for loading and unloading an installation for machining the edges of flat objects such as, for example, the edges of window glass intended for motor vehicles, although it can of course also be used in other machining installations.

The arrangement according to the invention can be adapted quickly and easily to the shape and size of the workpiece to be machined, i.e. the template. Once the length and the spacing of the endless belts of the central conveyor have been adjusted so as to form a supporting surface which, although as large as possible, is still within the contour of the template, it is sufficient to adjust the interval between the supports of the upstream and downstream conveyors and the position of the arms relative to their respective supports.

Naturally, the invention is by no means limited to the embodiment described above with reference to the accompanying drawings, it also lends itself to modified embodiments within the scope of the appended claims.

I claim:

1. The combination comprising a machining table provided with means for machining a workpiece thereon, and an arrangement for delivering the workpiece to the table and for removing the machined workpiece therefrom, the combination comprising a central, non-driven conveyor fixedly mounted on the table; a first frame separate from the table and situated upstream thereof and in line with the central conveyor; an upstream conveyor mounted on the first frame; a second frame separate from the table and situated downstream thereof and in line with the central conveyor; a downstream conveyor mounted on the second frame; means for horizontally displacing the upstream and downstream conveyors between a first position where they are both remote from the central conveyor and second position where they are both adjacent the central conveyor; drive connection means for enabling the upstream and downstream conveyors to drive the central conveyor when in the said second position; retractable retaining means for positioning the workpiece received on the central conveyor and for holding it on the work table throughout the entire machining operation; and means for lowering the central conveyor from the workpiece during the machining operation; whereby the central conveyor receives and retains a workpiece from the upstream conveyor when the upstream and downstream conveyors are in their said second positions, machines the workpiece while the upstream and downstream conveyors are in their first positions, and then delivers the workpiece to the downstream conveyor when the upstream and downstream conveyors are back in their said second positions.

2. A combination as claimed in claim 1, wherein the upstream conveyor and the downstream conveyor each comprise a chassis displaceable relative to the frame under the action of a jack, the chassis having two parallel, independent supports each equipped with a non-adjustable endless belt travelling around two end pulleys mounted on the support and with an adjustable, endless belt parallel to the said non-adjustable belt and travelling around two end pulleys mounted at the ends of a horizontal, sliding arm lockable in position relative to the support.

3. A combination as claimed in claim 2, wherein the adjustable and non-adjustable endless belts are parallel to one another the non-adjustable belts being between the adjustable belts.

4. A combination as claimed in claim 2 wherein the two supports are independently displaceable laterally in relation to the chassis.

5. A combination as claimed in any of claim 2 wherein the non-adjustable belts and the adjustable belts also each travel around three pulleys of which one is driven by a motor.

6. A combination as claimed in claim 2 wherein the central conveyor comprises two parallel endless belts colinear with the adjustable endless belts of the upstream conveyor and with the adjustable endless belts of the downstream conveyor, each of the belts of the central conveyor being entrained around two end pulleys of which one is mounted for free rotation about a spindle mounted for free vertical displacement in a stirrup, the said spindle having a roller at each of its ends.

7. A combination as claimed in claim 2 wherein each of the sliding arms of the upstream and downstream conveyors comprises at its end nearest tne central conveyor a fork in which one of the end pulleys of the endless adjustable belt is mounted for free rotation, and an intermediate roller designed to drive by friction an end pulley of the central conveyor, the said intermediate roller constituting the said drive connection means.

8. A combination as claimed in claim 7, wherein each fork has two vertical surfaces each terminating in the form of a cam adapted to cooperate with one of the rollers of the pulleys of the central conveyor thereby to lift the central conveyor when the upstream and downstream conveyors are in their said second positions and to lower the central conveyor when the upstream and downstream conveyors are in their said first positions.

9. A combination as claimed in claim 1, wherein the retractable retaining means comprises positioning means in the form of stops arranged on a plate which is vertically displaceable by jacks, and holding means in the form of a lower pressing means which is fixed in relation to the table and an upper pressing means which is vertically displaceable.

10. A combination as claimed in claim 1 wherein the upstream conveyor is provided with adjustable stops for positioning the workpiece to be machined upstream of the upstream conveyor.

11. A combination as claimed in claim 1 for machining the edges of a flat object, further comprising a horizontal, rotary template corresponding to the outline of the workpiece, retractable retaining means provided on the template for positioning the workpiece in line with the template, pressers provided on the template for holding the workpiece relative to the template during a machining cycle, a mobile machining block carried by a pivoting structure and comprising a guide roller adapted to follow the contour of the template, and a grinding wheel for machining the edges of the workpiece during rotation of the template.

12. A combination as claimed in claim 11, wherein the template comprises two parallel sides angularly offset relative to the direction in which the three conveyors are aligned.

* * * * *